(12) United States Patent
Krinner

(10) Patent No.: US 7,752,806 B2
(45) Date of Patent: Jul. 13, 2010

(54) HOLDING DEVICE FOR ROD-SHAPED COMPONENTS

(75) Inventor: Klaus Krinner, Straßkirchen (DE)

(73) Assignee: Krinner Innovation GmbH, Strasskirchen (DE)

( * ) Notice: Subject to any disclaimer, the term of this patent is extended or adjusted under 35 U.S.C. 154(b) by 35 days.

(21) Appl. No.: 11/480,870

(22) Filed: Jul. 6, 2006

(65) Prior Publication Data

US 2007/0012851 A1 Jan. 18, 2007

(30) Foreign Application Priority Data

Jul. 6, 2005 (DE) .................. 20 2005 010 632 U

(51) Int. Cl.
*A47G 33/12* (2006.01)

(52) U.S. Cl. ....................................... 47/40.5

(58) Field of Classification Search .................. 47/40.5; D11/130.1; 248/523–525
See application file for complete search history.

(56) References Cited

U.S. PATENT DOCUMENTS

| | | | | |
|---|---|---|---|---|
| 1,233,207 A * | 7/1917 | Elbe | ........................... | 248/522 |
| 2,891,747 A * | 6/1959 | Steede | ........................ | 47/40.5 |
| 4,989,820 A * | 2/1991 | Sterling | ........................ | 248/523 |
| 5,114,113 A * | 5/1992 | Krinner | ....................... | 248/525 |
| 5,160,110 A * | 11/1992 | Praegitzer | .................... | 248/523 |
| 5,490,350 A | 2/1996 | Eisenschenk et al. | | |
| 5,535,977 A * | 7/1996 | Poeshty | ....................... | 248/524 |
| 5,797,579 A | 8/1998 | Krinner | | |
| 5,918,849 A * | 7/1999 | Bliss | ........................... | 248/523 |
| 6,129,325 A * | 10/2000 | Niklas | ......................... | 248/523 |
| D444,412 S | 7/2001 | Krinner et al. | | |
| D449,560 S | 10/2001 | Krinner et al. | | |
| D454,518 S | 3/2002 | Krinner et al. | | |
| 6,854,700 B2 * | 2/2005 | Schmitz | ........................ | 248/523 |
| 7,347,400 B2 | 3/2008 | Thurner et al. | | |
| 2005/0051695 A1 * | 3/2005 | Kovach | ....................... | 248/524 |

FOREIGN PATENT DOCUMENTS

| | | |
|---|---|---|
| DE | 39 32 473 | 2/1992 |
| DE | 195 45 471 | 6/1997 |
| DE | 296 22 984 | 12/1997 |
| DE | 196 32 305 | 2/1998 |
| DE | 299 04 435 | 7/1999 |
| DE | 299 13 474 | 11/1999 |

(Continued)

*Primary Examiner*—Timothy D Collins
*Assistant Examiner*—Michael Kreiner
(74) *Attorney, Agent, or Firm*—Davidson Berquist Jackson & Gowdey LLP

(57) ABSTRACT

A holding device for rod-shaped components comprising holding elements that move through a series of positions. To hold a component the holding elements move in sequence from open releasing positions, to contacting positions, to aligning positions and finally to fully closed positions. Holding elements in aligning positions permit the held component to be moved and aligned even though the holding elements are more firmly in contact with the component than in their contacting positions. Slide-resistant surfaces formed on the holding elements are made in such a way that in the case of the movement of a misaligned component, sliding resistance is intensified in one direction while sliding resistance is reduced in another direction to permit movement of the component in that direction into the desired alignment. The holding elements are moved in the opposite sequence to release a component.

16 Claims, 4 Drawing Sheets

FOREIGN PATENT DOCUMENTS

| | | | |
|---|---|---|---|
| DE | 100 00 879 | 7/2001 | |
| DE | 201 05 005 | 8/2001 | |
| DE | 202 09 344 | 12/2002 | |
| DE | 102 20 879 | 8/2003 | |
| DE | 200 23 309 | 10/2003 | |
| DE | 203 20 092 | 6/2004 | |
| DE | 20 2004 020 005 | 5/2005 | |
| DE | 20 2004 020 006 | * 5/2005 | ................ 47/40.5 |
| DE | 10 2004 023 238 | 9/2005 | |
| DE | 10 2004 062 826 | 7/2006 | |
| EP | 1 318 740 | 12/2004 | |

* cited by examiner

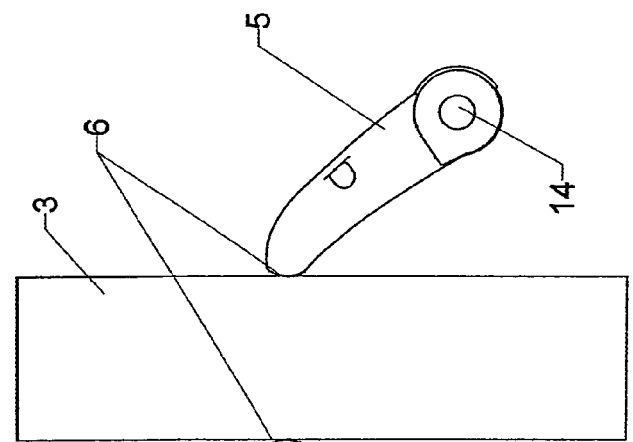
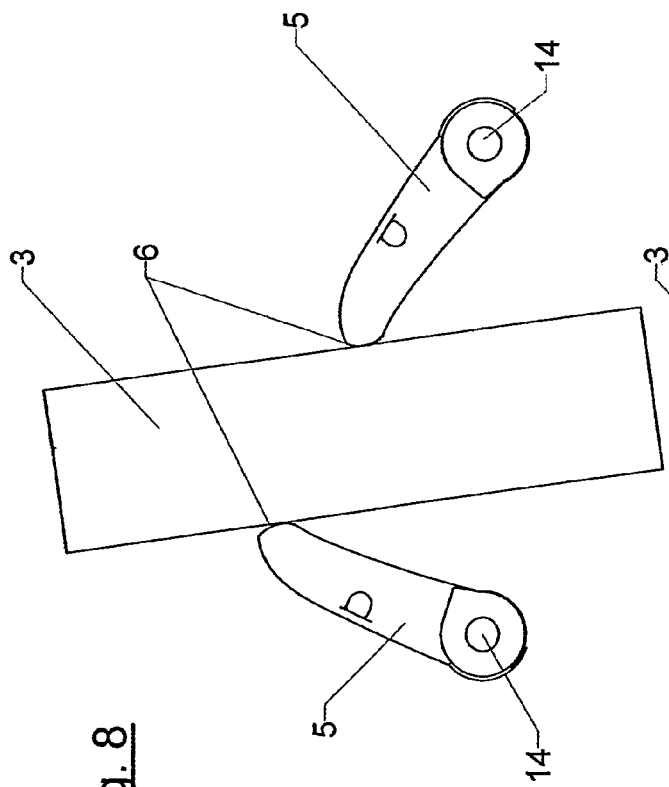
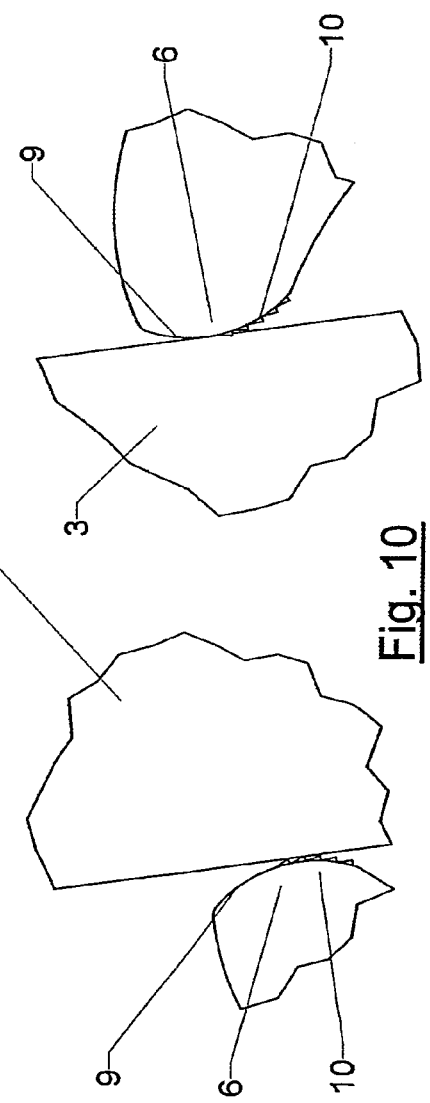

HOLDING DEVICE FOR ROD-SHAPED COMPONENTS

CROSS-REFERENCE TO RELATED APPLICATIONS

This application claims priority to German Application No. DE 20 2005 010 632.1 filed Jul. 6, 2005.

BACKGROUND

The invention relates to a holding device for rod-shaped components, particularly a Christmas tree stand.

Holding devices of this type are known to exist in various designs.

One example of this is the tree stand according to the patent specification DE 102 20 879 A1 of the applicant. In this tree stand, the holding elements are designed as pivoted levers, which are linked to the receiving part of the tree stand and whose end side comprises a contacting region, by means of which every holding element comes into contact with the tree trunk during the tensioning process of the tensioning device. A flexible connecting element—usually a rope—which can be subjected to a tensile load or be loaded in tension and which is guided such that it can move transversely to the holding elements and engages at the latter, is used for this purpose.

It has also already been proposed (DE 100 00 879 A1; DE 200 23 309 U1; EP 1 318 740 B1; DE 299 04 435 U1; DE 299 13 474 U1), to use several flexible connecting elements, instead of one—specially a rope—and to assign them to each holding element or to each group of holding elements.

In these cases, the pivoted levers extend upwards from their points of articulation on the foot part or on the receiving part of the tree stand in such a way that each of them can be pivoted in a plane between their releasing position and their holding position, said planes intersecting approximately in the axis of symmetry of the stand. Each contacting region is designed on the upper end of the pivoted lever on its side facing the axis of symmetry, said upper end being opposite to the point of articulation.

However, it has also been proposed (DE 195 45 471 A1; DE 196 32 305 A1), to use levers in horizontal alignment instead of such upwardly extending pivoted levers or even axially moving bolts (DE 100 00 879 A1), which are guided aligned to the center of the tree stand, or pushing elements (German Utility Model no. 20 2004 020 005 8) instead of pivoted levers.

In all these tree stands, it is possible to distinguish several operating states from one another: In the releasing position the holding elements release the receiving part for inserting or taking out the rod-shaped component, e.g., a tree trunk—i.e., the holding elements are not yet in contact with the tree trunk. When the tensioning device is actuated, this releasing position is followed by the contacting position in which the holding elements contact the tree trunk. Thus in this position, it is still possible, for example, to align the tree, however without the tree being held conveniently, as a result of which the alignment can be lost easily before the tree can be finally clamped firmly. When the tensioning device is slightly actuated further, the contacting position is followed directly by the holding position. In the holding position, the holding elements rest against the tree trunk with a considerable holding force. The tree is thus clamped firmly and thus can also hardly be aligned. As a result it is hardly possible to correct alignment errors. There is an even lesser likelihood of correcting alignment errors if the holding elements, as mostly known from prior art, bear one or more sharp peaks, claws or the like, which dig into the tree trunk during the tensioning process immediately after the contacting position is exceeded, in order to hold the tree trunk particularly tightly.

In order to ensure that the tree trunk can be aligned easily and reliably before being finally fixed into place and without losing this alignment before the holding position is reached, the applicant (Utility Model no. 20 2004 020 005 8) has proposed to design the contacting regions of the holding elements as arched, smooth sliding surfaces, for example, convexly or cylindrically instead of with peaks, claws or the like, and thus to create an additional defined aligning position as an intermediate position between the contacting position and the holding position. In this position, the holding elements already hold the tree trunk with a certain contact pressure. Thus, for example, the tree trunk would not topple down easily if it were released. However, the tree trunk can slide on the contacting regions for the purpose of the alignment. Furthermore, in said Utility Model Specification, the applicant has already proposed to design the contacting regions elastically for further facilitating the alignment. Once the desired position of the tree trunk is reached, the holding elements can then be transferred out of the aligning position into the final holding position by actuating the tensioning device over a very slight tension path. Using the conventional tensioning devices of the type of a ratchet, this final tensioning can take place e.g., in an uninterrupted process.

For the same purpose the applicant has additionally proposed in the German Utility Model no. 20 2004 020 006 6 to create a defined aligning position by designing the holding elements themselves to be resilient or by assigning to each holding element an elastic buffer element in its contacting region. During the tensioning process, said buffer region is pressed against the tree trunk with a defined, adjustable force that is smaller than the force applied in the holding position and that is applied such that the tree trunk is fixed temporarily, however is not yet alignable. As a result, the holding elements can deploy their full holding force only when the buffer action of the elastic element is used up. The applicant has further proposed to assign the elastic buffer element for the same purpose to the flexible connecting element, which can be subjected to a tensile load or be loaded in tension.

Particularly the proposals of the applicant to create a separate aligning position by the slidable smooth configuration of the contacting regions or by incorporating a buffer have yielded good practical results. They have eliminated the difficulties when aligning the tree trunk, said difficulties being caused by the pointed or claw-shaped contacting regions known from prior art. However, these proposals also exhibit certain shortcomings. The installation of buffer elements is structurally relatively cumbersome and prone to breakdown in certain circumstances. Indeed the slidable smooth design of the contacting regions improves the behavior of the holding device when aligning the rod-shaped component. However, due to the absence of an appreciable slide-resistance, relatively large holding forces are required in the holding position if the tree trunk is to be supported in a really secure manner. This calls for a relatively robust construction, which is expensive in terms of material and costs if damages caused by premature fatigue of material are to be avoided.

Incidentally, what is common to all the solutions proposed in the prior art is that the contacting regions are designed uniformly in the respective selected configuration—regardless of whether they are provided with sharp peaks or are designed to be smooth or rounded and smooth, or even cylindrical or provided with a buffer element. That is, the contacting regions comprise either one or more claws or peaks with all their above-mentioned advantages and disadvantages (good holding force, poor possibility of alignment) or a smooth, arched surface, if appropriate, which indeed facilitates the alignment, however requires considerable pressing forces for holding the tree trunk securely. In the solutions with a buffer element also, a homogeneous contacting region is always provided, which is not adapted to the different operating states. The additional structural measures such as buffer elements, elastic design of the components, single rope technique or multiple rope technique could indeed reduce, though not dispel the disadvantages of the respective homogeneous configuration of the contacting regions.

SUMMARY OF THE INVENTION

In conjunction herewith, the object underlying the invention is to achieve a further improvement of the circumstances in the aligning position and the holding position of the tree and in doing so to simultaneously reduce the structural and material expenses for cutting down on costs and improving the service life of the tree stand to the maximum extent possible.

This is achieved by providing the contacting regions of the holding elements with a convexly arched surface having a selectively slide-resistant design instead of peaks or claws, which practically eliminate a sliding movement in an aligning position and instead of an arched, smooth surface which causes problems in the holding position for want of an appreciable slide-resistance.

This slide-resisting surface must be designed selectively with roughened up structures, ridges and grooves, blunted teeth or the like in such a way that just like the smooth contacting regions known from prior art, the contacting regions are in contact with the tree trunk frictionally when the smaller pressing forces are applied in the aligning position. However, the contacting regions according to this invention are in contact with the tree trunk using a defined higher frictional resistance. In doing so, the surface structures of the contacting regions do not penetrate significantly into the surface of the tree trunk. The contacting regions hold the tree trunk sufficiently in such a way when the slight contact pressure of the aligning position is applied that the tree trunk does not topple over if released. On the other hand, the slide-resisting surface must be designed in such a way that, like the peaks and claws known from prior art, it penetrates into the tree trunk, for improving the hold of the tree trunk only when the larger pressing forces required for the hold are applied.

The precise manner of designing the surface for this purpose depends on different factors; it depends particularly on the size of the holding device and accordingly the size of the trees that it must receive. However, it also depends on the available tension force of the tensioning device, i.e., on its design and dimensions and on the material properties of the holding elements. However, a grooved structure extending tangentially to the axis of symmetry or a two-dimensional structure having corresponding groove-shaped indentations as illustrated in FIG. 2 and FIG. 3 may be recommended as a rule, e.g., for the conventional sizes of Christmas tree stands. However, a nub-like structure as indicated in FIG. 2 and FIG. 2a or a structure of intersecting indentations as indicated in FIG. 3a are also suitable. The outer contour of the contacting regions is to be designed to be two-dimensional or rounded as indicated in FIGS. 2 and 3 in such a way that they can slide on the tree trunk when small pressures are applied while distinctly larger pressures are required to allow the contour to penetrate into the tree trunk. However, it is also possible to achieve the desired coefficients of friction selectively by means of materials or these materials in combination with structures. For this purpose, materials having increased coefficient of friction, for example, glass fiber-reinforced polyamide, or the like are recommended as materials for the contacting regions. However, in order to achieve an approximate desired smaller frictional resistance of the outer contour of the contacting regions, the latter can also be produced from a material of correspondingly lower coefficient of friction such as, for example, polyoxymethylene.

The invention can be used advantageously in many embodiments of tree stands known from prior art. However, the preferred embodiment is the pivoted lever construction in which the connecting element is at least a flexible component, particularly a rope, which can be subjected to a tensile load or be loaded in tension, and which is guided such that it can move transversely to the holding elements (5) and engages at the latter.

However, the configuration according to the invention can also be used albeit only with a limited advantage if pivoted levers in a horizontal position (for example according to DE 195 45 471 A1 or DE 196 32 305 A1) or axially movable bolts (DE 100 00 879 A1) or pushing elements (German Utility Model no. 20 2004 020 005 8) are used instead of upwardly extending pivoted levers.

The Surfaces of the contacting regions can be designed in such a way that they oppose their upwardly directed sliding movement on the tree trunk with a larger resistance than their downwardly directed sliding movement. The slide resistance is anyway higher during the upward sliding movement of the contacting regions (irrespective of their structure) since the upward sliding movement must take place against the resistance of the upwardly sliding holding element, which is already held for example, with alignment force. In contrast, the downwardly sliding holding element only has to follow the downward movement. However, in order to facilitate the alignment, it is essential to facilitate the downwardly sliding movement and to hinder the upwardly sliding movement. The proposed different design of the slide-resistance in the two sliding directions of the holding elements thus brings about an additional desired facilitation of the alignment while hindering the misalignment.

Various configurations for the surface of the contacting region can be used to achieve the smaller slide-resistance in one sliding direction and larger slide-resistance in the other direction. For example, a correspondingly directed herring-bone structure or the scaly structure indicated in FIGS. 4 and 4a are suitable.

It is proposed to optimize the direction-dependent variably slide-resistant design of the surfaces of the contacting regions in that the resistance with which the surface of the contacting region (6) opposes its upwardly directed sliding movement on the tree trunk (3) continuously increases in the course of the upwardly directed sliding movement and the resistance with which the surface of the contacting regions (6) opposes its downwardly directed sliding movement continuously decreases in the course of the downwardly directed sliding movement.

This can take place, as indicated in FIGS. 4 and 4a, using a corresponding increasing or decreasing scale size, a varying sharpness of the scale edges or also using a varying sharpness of the ridges or peaks in the configurations having a grooved structure or nub-like structure according to FIGS. 2 and 2a or by reducing the two-dimensional regions of the outer contour in the case of the two-dimensional structures having groove-shaped indentations according to FIGS. 3 and 3a.

This configuration of the contacting regions results in an additional facilitation of the alignment of a tree trunk. If the tree trunk deflects too widely in one direction laterally, then as a result of the steep position, thus created, of the holding elements towards which the tree trunk is inclined as illustrated in FIGS. 8 and 10, the more slide-resistant parts of the contacting regions get into action and retard the additional misalignment. This takes place, for example in the holding devices can have upwardly pointing holding elements. In contrast, the aligning movement into the desired vertical position is promoted since the opposing holding elements are flatter and thus oppose the directional correction with only slight resistance as a result of the engagement of the more slidable parts of their contacting regions.

If horizontal pivoted levers (DE 195 45 471A1; DE 196 32 305 A1) or axially movable bolts (DE 100 00 879 A1) guided aligned to the center of the tree stand or pushing elements (German Utility Model no. 20 2004 020 005 8) are used instead of vertical pivoted levers, then the result would be a similar effect since the tree trunk having an increasing lateral deflection there also is prevented from additional misalignment by the engagement of the more slide-resistant parts of the contacting regions. In contrast, the correction in the desired vertical position does not counteract any comparable resistance due to the smaller sliding resistance of the parts of the contacting regions coming into contact with the tree trunk.

By all means, the configuration of the contacting regions has an advantageous effect in all the pivoted lever constructions and at the same time in the case of tree trunks of varying thicknesses. In the case of particularly thin tree trunks, which require smaller holding forces, only the lesser slide-resistant sections come into action in certain circumstances even in the holding position. The holding forces thus generated are all the more sufficient as the holding elements in the case of thin tree trunks are correspondingly flatter (or steeper to the tree trunk) in the holding position. Consequently, a certain self-blocking action of the holding elements supports their holding function. In the case of thicker tree trunks, larger holding forces are required anyway and the self-blocking action of the holding elements is largely absent due to their steep position (parallel position to the tree trunk)—i.e., the entire holding force has to be applied by the connecting element/s. In such cases related to thicker tree trunk, the more slide-resistant parts of the contacting regions come directly into action and improve the holding force.

Each of the contacting regions need not be regarded as a uniform region having an accordingly uniform configuration, as is the case in prior art. Instead the contacting regions can be divided into different sections, which come into action in the different operating states of the tree stand or in different phases depending on the thickness of the clamped tree trunk. In order to optimize the mode of action of the tree stand, these sections can be designed variably corresponding to their sphere of action.

This configuration according to the invention also is advantageous particularly in the pivoted lever constructions. However, it can also be used if levers in the horizontal position are used instead of upwardly extending pivoted levers (for example according to DE 195 45 471 A1 or DE 196 32 305 A1) and if the contacting regions are arranged on the ends opposite to the point of articulation of the levers in such a way that said contacting regions face the axis of symmetry of the tree stand or also in the case of axially movable bolts (DE 100 00 879 A1) or pushing elements (German Utility Model no. 20 2004 020 005 8).

In particular, this inventive configuration of the contacting regions also has positive effects on the alignment procedure itself. If the tree trunk is deflected too widely in a direction laterally, then as a result of the steep position, thus created, of the holding elements towards which the tree trunk is inclined, as illustrated in FIGS. 8 and 10, the slide-resistant sections of the holding elements get into action and retard any additional misalignment. In contrast, the aligning movement into the desired vertical position is promoted since the opposing holding elements remain flatter and thus slide smoothly as a result of the engagement of their slidable sections.

However, this inventive configuration of the sections of the contacting regions also has advantageous effects in the case of tree trunks of varying thicknesses. In the case of particularly thin tree trunks, which require small holding forces, only the less slide-resistant sections, which are more distant from the point of articulation of the holding elements—at best a transition zone between the more slide-resistant and less slide-resistant sections—come into action under certain circumstances even in the holding position. The holding forces thus generated are all the more sufficient here as the holding elements in the case of thin tree trunks remain correspondingly flatter (or steeper in relation to the tree trunk) in the holding position. As a result, a certain self-blocking action of the holding elements supports their holding function. In the case of thicker tree trunks, higher holding forces are required anyway and the self-blocking action of the holding elements is largely absent due to their steep position (parallel position to the tree trunk) i.e., the entire holding force has to be applied by the connecting elements. In such cases related to thicker tree trunks, the additional, more slide-resistant sections located nearer to the point of articulation come directly into action and improve the holding force.

The different sections of the contacting region are not supposed to be engaged simultaneously per se due to their varying functions. In contrast, they are located so close to one another that there can be limit states during the transition from the aligning position into the holding position or even in the aligning position itself. In these limit states, the one section is already partly engaged before the other region goes completely out of contact with the tree trunk. These transition states are desired as preforms of a sliding transition.

The configuration of the different sections of the contacting regions can have a variety of characteristics. Accordingly, the first sections of smaller slide-resistance are blunt, roughened up, or provided with a profile of blunted teeth, ribs, or the like. However, the slide-resistant effect can also be created using an unprofiled surface made of a material having a larger coefficient of friction. In contrast, the additional sections of larger slide-resistance are to be designed in a toothed, ribbed, scaled form or also with blunted teeth, ribs, or the like.

However, naturally all the configurations described herein are available for this purpose. This also holds true particularly for the configurations without transition between the sections of increasing and decreasing slide-resistance, which varies depending on the sliding directions.

Thus at least the additional sections (optionally, however also the fast ones) should be designed in such a way that they oppose an upwardly directed sliding movement of the holding elements on the tree trunk with a higher resistance than their downward sliding movement. As already explained above, the slide-resistance is anyway higher during the upward sliding movement since the upward sliding movement must take place against the resistance of the upwardly sliding holding element which is already held, e.g., with aligning force. In contrast, the downward sliding holding element only has to follow this movement. However, in order to facilitate the alignment, it is essential to facilitate the downwardly sliding movement and to hinder the upward sliding movement. The proposed varying design of the slide-resistance in both the sliding directions of the holding elements thus brings about an additional desired facilitation of the alignment while hindering the misalignment.

The invention can start out with a stepped, variably slide-resistant design of the sections of the contacting regions. Particularly advantageously however, the stepless configuration of the sliding ability of each of the sections separately or the stepless design of the contacting regions collectively may extend from lesser to more slide-resistant (and vice-versa) over their first and the additional sections in each case.

The surface configurations of the contacting regions, which are required for this purpose and which are less slide-resistant in one sliding direction and more slide-resistant in the other.

The same holds true where the slide-resistance increases during the downward sliding movement of the contacting regions on the tree trunk and decreases during the reverse sliding movement. Here also in consistent implementation, the result is a stepless configuration over all the sections of the contacting regions and thus finally a configuration wherein the resistance with which the surfaces of the contacting regions (6) oppose their downwardly directed sliding movement on the tree trunk (3) continuously increases in the course of the downwardly directed sliding movement and the resistance with which the surfaces of the contacting regions (6) oppose their upwardly directed sliding movement continuously decreases in the course of the upwardly directed sliding movement.

Thus provision has been made to create a sufficiently large lateral displacement path of the tree trunk in relation to the holding elements in that the contacting regions extend laterally from the holding elements beyond the latter parallel to the pivot axis of the latter.

The contacting regions can also have a straight-lined contour tangential to the axis of symmetry of the receiving part.

The contacting regions can be designed as cylinders aligned with their axes tangentially to the axis of symmetry. Differently bent or arched surfaces can be suitable in a similar way. However, a curvature is preferred only in one plane. Consequently, a straight-lined contour of the contacting regions results in the direction tangential to the axis of symmetry.

The contacting regions can be designed as one piece with the holding elements or as separate contacting bodies.

It can be particularly advantageous to design them from an elastic material. In this connection, a production from a material of the type of polyurethane can be conceived, the result being a contacting body approximately having the properties of a bottle cork. Such a contacting body facilitates the sliding movement of the tree trunk in relation to the contacting regions in the aligning position. However, in the subsequent transition of the holding elements into the holding position, said contacting body is easily compressed elastically. This results in an additional tension effect, which ensures a particularly secure holding of the tree trunk in the position once reached. It also ensures, e.g., a certain retension effect, which can, for example, compensate for shrinkages of the tree trunk caused by the drying of the latter during use.

Thus, with small structural expenditure, even by cutting down on expensive additional devices such as e.g., buffer elements in certain circumstances, the invention ensures a stepped and even a steplessly improved adaptation of the holding elements or of their contacting regions to the respective requirements of the aligning and holding processes of the tree trunk. This also makes the system inter alia user-friendlier as a result of utilizing its automatic slide-resistant actions. At the same time the invention manages with smaller dimensions of its tensioning device, connecting elements and the holding elements. Thus the invention can be constructed with increased degree of efficiency, ease, and cost-effectiveness.

BRIEF DESCRIPTION OF THE DRAWINGS

The invention will now be explained in more detail based on the exemplary embodiments illustrated in the figures, of which:

FIGS. 8 and 9 illustrate different positions of the tree trunk in relation to the contacting regions of the holding elements; and FIG. 10 illustrates an enlarged detail shown in FIG. 8.

DETAILED DESCRIPTION

Figure 1:
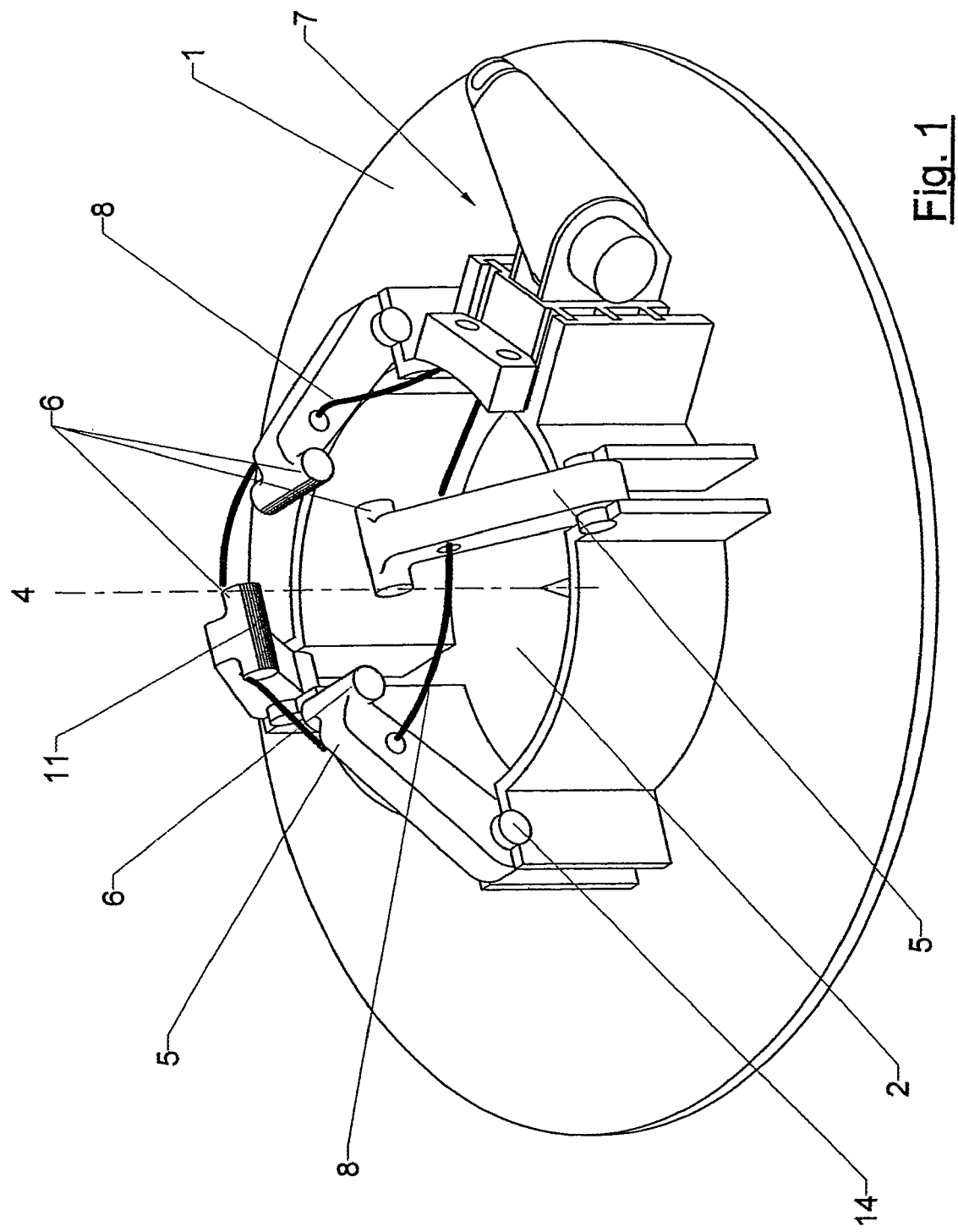
FIG. 1 illustrates the perspective view of the preferred embodiment of an inventive tree stand.

FIG. 1: The tree stand illustrated in FIG. 1 is known in its basic structure and is described and illustrated by the applicant, for example, in DE 102 20 879 A1. Such a tree stand has a foot part 1 with a receiving part 2, into which the tree trunk 3 to be clamped is inserted. The reference numeral 4 indicates the axis of symmetry of the receiving part 2, said axis of symmetry also corresponding to the longitudinal axis of the tree trunk 3 to be clamped. At the base of the receiving part, the usual central arbor is provided (not illustrated in FIG. 1), on which the tree trunk is fitted with its front side in the center before being clamped permanently. Holding elements 5 are provided, which have the form of pivoted levers. The holding elements 5, which comprise contacting regions 6 in the form of cylinders 11, are mounted pivotably in the points of articulation (pivot axes) 14 on the receiving part 2. A tensioning device 7 clamps the holding elements 5 by means of a flexible connecting element 8—usually a steel rope—which can be subjected to a tensile load or be loaded in tension and which moves transversely to the holding elements 5 and engages at the latter. This causes the holding elements 5 to swivel inwards towards the axis of symmetry 4. The holding elements 5 swivel about their pivot axes 14 and in doing so, move in planes, which run radially in relation to the axis of symmetry 4 and which intersect in the axis of symmetry 4.

Figure 2:
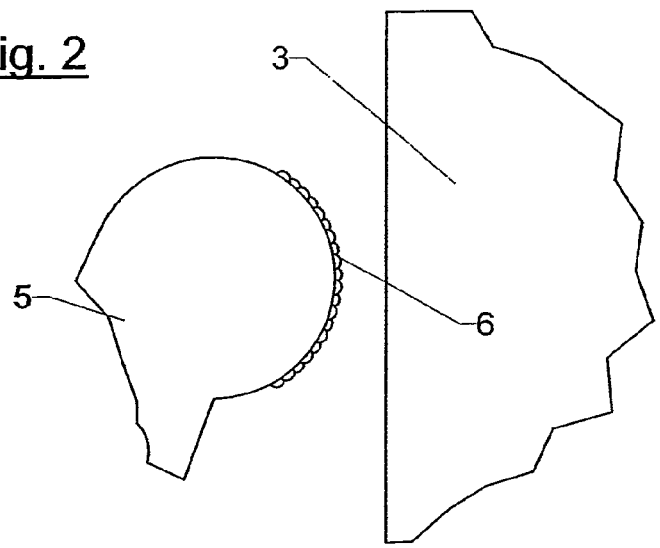
FIG. 2 illustrates the lateral view of a holding element having a grooved or nub-like surface of the contacting region.
Figure 3:
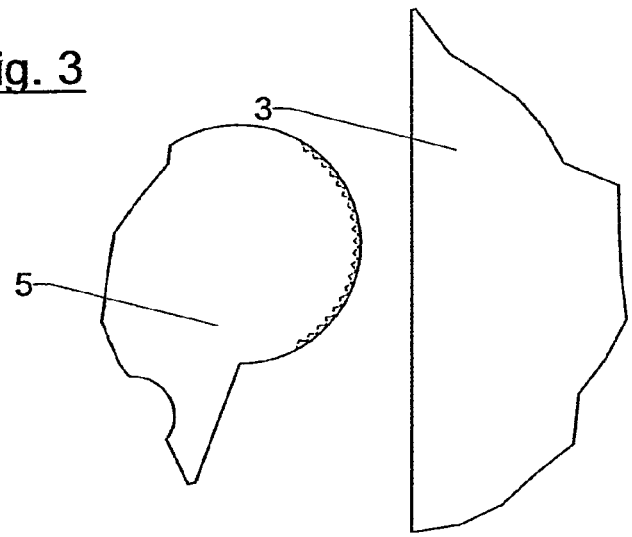
FIG. 3 illustrates the lateral view of a holding element having grooved indentations in the surface of the contacting region.
Figure 4:
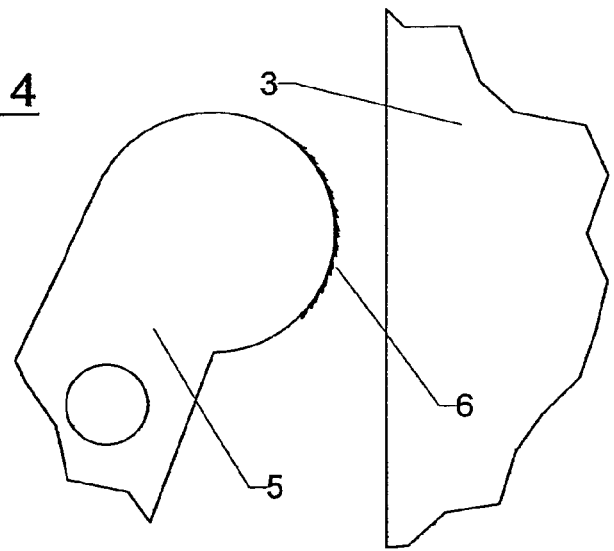
FIG. 4 illustrates the lateral view of a holding element having a scale-shaped surface of the contacting region.

FIGS. 2 to 4 illustrate some configurations of the slide-resisting surface of the contacting regions 6 of the holding elements 5 according to claim 1, said contacting regions being arched convexly to the axis of symmetry 4 of the tree stand.

FIG. 2 illustrates a grooved or nub-like structure designed uniformly over the entire contacting region (6).

Figure 2A:
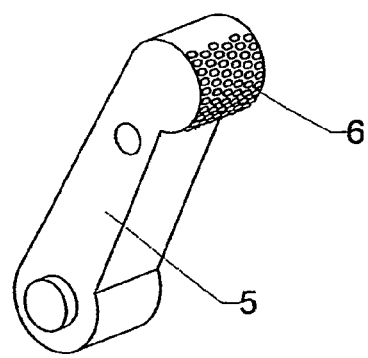
FIG. 2a illustrates a holding element having a nub-like surface of the contacting region in a perspective plan view of the contacting region.

FIG. 2a illustrates a corresponding nub-like structure in a perspective view.

FIG. 3 illustrates a structure having a smooth surface, which is designed uniformly over the entire contacting region 6 and which is provided with numerous grooved indentations.

Figure 3A:
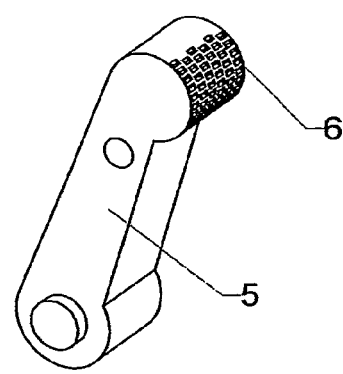
FIG. 3a illustrates a holding element having groove-shaped, intersecting indentations in the surface of the contacting region in a perspective plan view of the contacting region.

FIG. 3a illustrates the same configuration having intersecting grooved indentations.

Figure 4A:
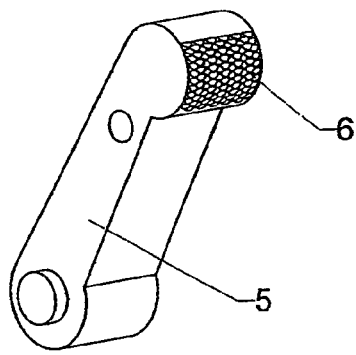
FIG. 4a illustrates a holding element having a scaled surface of the contacting region in a plan view of the contacting region.

FIGS. 4 and 4a illustrate a holding element 5 with contacting region 6 having a scaled surface, with the variation in the degree of the slide-resistance being accomplished by varying the size and shape of the scales.

Figure 5:
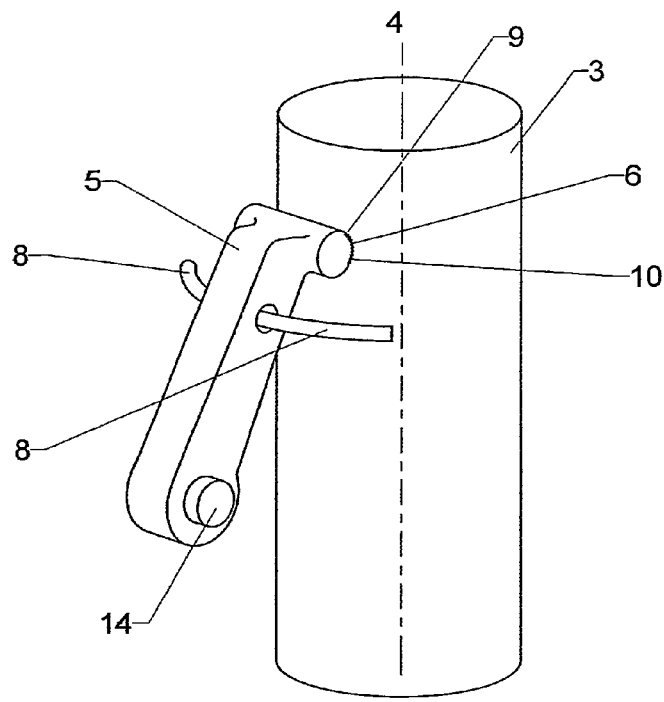
FIG. 5 illustrates an enlarged detail of the tree stand according to FIG. 1 having an integrated cylindrical toothed contacting region.
Figure 6:
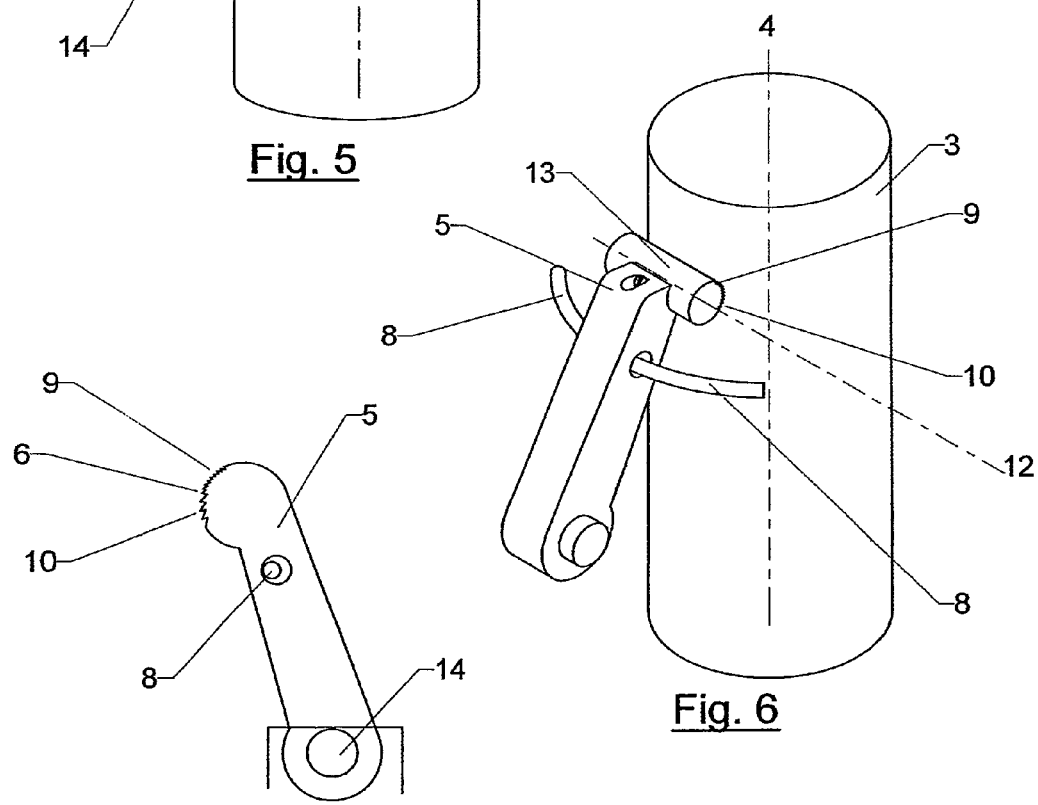
FIG. 6 illustrates an enlarged detail of the tree stand according to FIG. 1 having a contacting region, which is installed thereon and which is designed as a separate cylindrical toothed contacting body.

FIGS. 5 and 6 illustrate the inward swiveling movement of the holding elements 5 towards the axis of symmetry 4, and show the contacting regions 6 of the holding elements 5 coming into contact with the periphery of the tree trunk 3 to be clamped. This state is illustrated in FIGS. 5 and 6 in an enlarged view. FIG. 5 illustrates a holding element 5, which guides the flexible connecting element 8 into a borehole. The contacting region 6 is formed by an integrated cylindrical contacting body 13, which in FIG. 6 is a special cylindrical contacting body fixed to the holding element.

Figure 7:
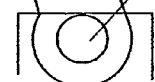
FIG. 7 illustrates the lateral view of an individual holding element having a first and an additional section.

FIG. 7 illustrates as a detail the lateral view of a holding element according to FIG. 5. The holding element 5 comprises a contacting region 6, which is composed of a first section of lesser slide-resistance 9, (illustrated here in a grooved form) and an additional section of more slide-resistance 10, (illustrated here in a serrated form).

FIGS. 8, 9, and 10 illustrate different positions of a tree trunk in relation to the holding elements in the manner in which these positions can result during the alignment procedure.

FIG. 8 illustrates an inclined position of the tree trunk, which requires correction. The figure reveals that in this position, the holding element 5 towards which the tree trunk 3 is inclined, acquires a steep position, which brings its (here lower) region or additional section 10 of more slide-resistance in contact with the tree trunk as in FIG. 10. As a result, the additional inclination of the tree trunk in this direction is hindered. At the same time, the other holding element 5 away from which the tree trunk is inclined, assumes a flat position, which brings its region or first section 9 of lesser slide-resistance (illustrated here without a visible structure) into contact with the tree trunk. This holding element thus opposes the correction of the tree position in its direction, that is the uprighting of the tree trunk with only slight resistance.

FIG. 9 illustrates the circumstances in the case of a vertically aligned tree trunk 3 and reveals that, substantially the same regions or sections of the contacting regions 6 are in contact with the tree trunk in the case of the two holding elements 5 here. In the case of thick tree trunks, these are the (lower) regions or additional sections of more slide-resistance 10. On the other hand, in the case of thinner tree trunks, these are the first sections of lesser slide-resistance 9. In the case of trunks of average thickness, if appropriate, these are also the regions located in-between or the adjoining parts of the two sections.

FIG. 10 illustrates as a detail of FIG. 8, the circumstances in the contacting region 6 in an inclined position of the tree trunk 3 requiring correction. It illustrates how in this case the other regions or sections of the holding region of different holding elements 5 are in contact with the tree trunk.

LIST OF REFERENCE NUMERALS

1 Foot part
2 Receiving part
3 Rod-shaped component/trunk of a tree
4 Axis of symmetry
5 Holding element
6 Contacting region
7 Tensioning device
8 Connecting element
9 First section (lesser slide-resistance)
10 Additional section (more slide-resistance)
11 Cylinder
12 Cylinder axis
13 Separate contacting body
14 Point of articulation (pivot axis) of the holding elements

The invention claimed is:

1. A holding device for permitting alignment of rod-shaped components therein comprising:
   a foot part,
   a receiving part for the rod-shaped component arranged on the foot part,
   a plurality of holding elements pivotally attached to the holding device, the plurality of holding elements being arranged about an axis of symmetry of the receiving part, each of said plurality of holding elements moving between a plurality of incrementally changed discrete positions starting from:
      an open releasing position, in which the holding elements release the receiving part for inserting or taking out the rod-shaped component,
      a next contacting position in which the plurality of holding elements are brought into initial contact with the rod shaped component, then into
      an aligning position in which the plurality of holding elements more firmly contact the rod shaped component than in the contacting position yet allow a defined sliding movement of at least some of the holding elements along the rod shaped component, and finally into
      a fully closed holding position in which the plurality of holding elements tightly grip the rod shaped component so that there is no sliding movement there between, and
   a tensioning device fixed to the foot part by which each of the plurality of holding elements can be moved, using at least one connecting element, out of the releasing position, to the contacting position, then to the aligning position and into the holding position,
   with each of said plurality of holding elements being furnished with a contact region that becomes progressively in greater contact with the rod shaped component as the holding elements move from the contacting positions to the aligning positions and finally into the holding positions, said contact regions having a surface which is convexly arched towards the axis of symmetry and which is slide resistant when in the aligning positions in such a manner that it establishes a higher slide resistance to upwardly directed siding movement of the rod shaped component and a lesser slide resistance to downwardly directed sliding movement of the rod shaped component.

2. The holding device according to claim 1, wherein the plurality of holding elements extend upwards from their point of articulation in such a way that each of them can move in a plane between the releasing position and the holding position, each such plane intersecting approximately the axis of symmetry.

3. The holding device according to claim 1, wherein the connecting element is at least a flexible member which can be subjected to a tensile load and which is guided such that it can move transversely to the plurality of holding elements and engages at the latter.

4. The holding device according to claim 1, wherein the slide resistance in a downwardly directed sliding movement on the rod shaped component continuously decreases in the course of the downwardly directed sliding movement and the slide resistance in an upwardly directed sliding movement continuously increases in the course of the upwardly directed sliding movement.

5. The holding device according to claim 4, wherein the slide-resistant surface is divided into at least two sections of varying slide-resistance.

6. The holding device according to claim 5, wherein in a first section of lesser slide-resistance is arranged at a further distance from the point of articulation of the holding elements than at least one additional section exhibiting more slide-resistance.

7. The holding device according to claim 6, wherein at most in a transition region between the several sections, the first sections of lesser slide-resistance and the additional sections of more slide-resistance, are simultaneously engaged with the rod-shaped component in their aligning position or holding position.

8. The holding device according to claim 7, wherein the first sections of lesser slide-resistance include roughened up portions, while the said at least one additional section of more slide-resistance is designed to be toothed, ribbed, or scaled.

9. The holding device according to claim 6, wherein said at least one additional section is in such a way that it opposes a downwardly directed sliding movement of the holding elements on the rod shaped component with lower resistance than in upwardly directed sliding movement.

10. The holding device according to claim 6, wherein said at least one additional section is provided with a correspondingly aligned structure which is more slide-resistant in one direction of movement and less slide-resistant in an opposite direction.

11. The holding device according to claim 10, wherein said at least one additional section is designed in such a way that the resistance counteracting downwardly directed sliding movement continuously increases in the course of the downwardly directed sliding movement and the resistance counteracting upwardly directed sliding movement continuously decreases in the course of the upwardly directed sliding movement.

12. The holding device according to claim 1 wherein the contacting regions extend laterally from each of the plurality of holding elements beyond the periphery thereof and parallel to the pivot axes thereof.

13. The holding device according to claim 1, wherein the Contacting regions have a straight-lined contour tangential to the axis of symmetry of the receiving part.

14. The holding device according to claim 1, wherein the contacting regions are designed as cylinders aligned tangentially to the axis of symmetry.

15. The holding device according to any of the claim 1, wherein the contacting regions are designed as one piece with the holding elements.

16. The holding device according to any of the claim 1, wherein the contacting regions are designed as separate contacting bodies connected to the holding elements.

* * * * *